Dec. 17, 1929.  G. E. WHITLOCK  1,739,997

TREAD

Filed June 3, 1929

Inventor

George E. Whitlock

By Faust F. Crampton

Attorney

Patented Dec. 17, 1929

1,739,997

UNITED STATES PATENT OFFICE

GEORGE E. WHITLOCK, OF TOLEDO, OHIO

TREAD

Application filed June 3, 1929. Serial No. 367,846.

My invention has for its object to provide a cushioned tread for automobile running boards, stairs, and the like, wherein an elastic sheet material may be molded to shape and secured in that shape by a rigid enforcing material that is completely embedded or enclosed within the composition of the elastic material. The invention also provides a means for attaching a decorative strip to the tread whereby it will be rigidly connected and form a part of the tread.

The invention may be contained in treads that vary in their details of construction and, to illustrate a practical application of the invention, I have selected a tread for automobile running boards as an example of the various embodiments of my invention, and shall describe it hereinafter. The particular tread selected for purposes of illustration is shown in the accompanying drawing.

Figure 1:
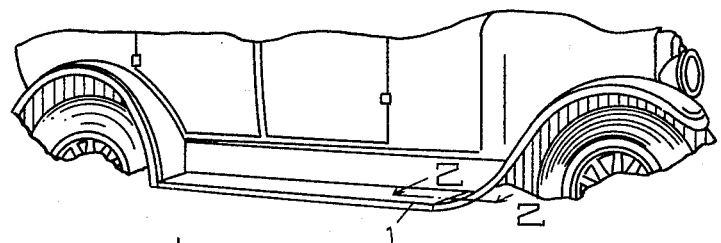
Figure 2:
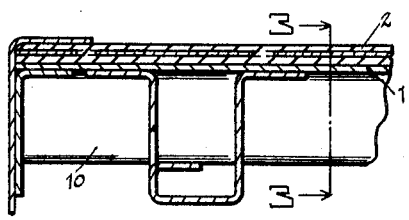
Figure 3:
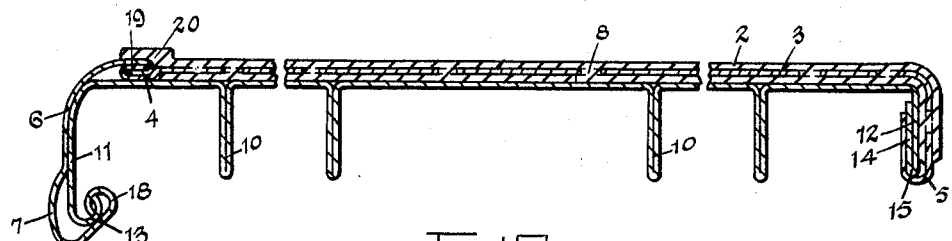

Fig. 1 is a perspective view of an automobile running board. Fig. 2 is a view of a part of a longitudinal section taken substantially on the plane of the line 2—2 indicated in Fig. 1. Fig. 3 is a transverse sectional view of the running board taken on the plane of the line 3—3 indicated in Fig. 2.

In the particular form of structure which has been selected as an example of structures containing my invention, the running board 1 of the automobile is, preferably, formed of sheet metal and the tread 2 is formed of a moldable plastic that is shaped into sheet form having an outline the same as that of the running board 1. The composition of the sheet material of which the tread is formed may be any suitable composition that is commonly used for covering floors and the like. In the particular form of construction, it is formed of rubber suitably vulcanized to render it pliable and elastic in order to form a cushion covering for the top surface of the running board 1.

When the rubber is formed to shape in suitable molds, a sheet metal plate 3 is enclosed within the mold and so that a major portion will be embedded and completely contained within the elastic material of the tread. The sheet 3 is, preferably, sheet steel that may be treated so as to cause adherence of the vulcanized rubber to the sheet. It is preferably perforated as at 8 to allow the rubber on opposite sides to become integrated when molded. The edge portions 4 and 5 of the sheet 3 protrude from the edges of the molded tread material. The protruding edge portion 4 of the sheet 3 is used for connecting a strip 6 of metal that may be nickel-plated and beaded as at 7 to form a trim for the edge of the running board 1.

The running board 1 is provided with a plurality of looped portions 10 that extend substantially the length of the running board and form a reinforcing means that greatly strengthens the running board. The running board 1 also has depending flanges 11 and 12 that extend along its edges. The flange 11 has an inwardly curved portion 13, while the flange 12 has a returned portion 14 that forms at the fold a relatively thick rounded edge 15. The strip 6 has an inwardly curved edge portion 18 for engaging over the curved portion 13 of the flange 11. The protruding edge portion 5 of the sheet 3 is bent over the rounded folded edge of the flange 12 and, preferably, so as to locate the inner edge of the sheet 2 near the folded edge of the flange 12. The curved edge portion 18 of the strip 6 is placed in the curved portion 13 of the flange 11, whereupon the curved edge portion 13 is turned closer to the body of the flange 11 to secure the strip 6 and thereby secure the tread to the running board.

In the formation of the tread, the edge portion 4 of the sheet 3 protrudes at a point within the edge of the composition sheet 2 and is interlocked with the strip 3 by a folded lock, as by the folded overlapping edges 19, which are located below and within the edge of the sheet 2. Preferably, the sheet 2 is provided with a raised ridge 20 that extends over the metal that forms the interlocking edges 19 of the sheet 3 and the strip 6 and rests thereon when the tread is formed. Thus the strip 6 may be formed of material whose decorative character might be affected by the treatment of the composition of the cushion sheet 2 when the sheet is formed and one that could not be decorated as desired when connected to the sheet 2.

I claim:

1. In a tread for running boards of automobiles, the running board having depending flanges, a sheet material forming a covered cushion for the top of the running board and having sheet metal embedded therein, the sheet metal having a protruding edge portion, a strip of decorative metal secured to the protruding edge of the sheet metal, the cushioned tread portion having an edge portion overlapping and resting upon the edge portions of the strip and the sheet metal to cover the same.

2. In an automobile running board cushion tread, a sheet of cushioning material, a sheet of metal embedded within the cushioning material and having a protruding edge portion, a strip of decorative material having an edge portion overlapping and folded with the protruding edge portion of the sheet metal, the sheet material having an edge portion covering the edges of the sheet metal and the strip and resting thereon.

3. In an automobile running board cushion tread, a sheet of cushioning material, a sheet of metal embedded within the cushioning material and having a protruding edge portion, a strip of decorative material connected to the sheet metal along the edge of the strip and the protruding edge portion of the sheet metal, the sheet material having a raised ridge extending along the outer edge of the sheet material and resting on the interconnected edges of the metal sheet and the strip.

In witness whereof I have hereunto signed my name to this specification.

GEORGE E. WHITLOCK.